United States Patent [19]

Gable et al.

[11] 4,234,952

[45] Nov. 18, 1980

[54] CONFLICT RESOLUTION BY RETRANSMISSION DELAY ON SHARED COMMUNICATION MEDIUM

[75] Inventors: Melvin G. Gable, Ypsilanti; Richard H. Sherman, Plymouth, both of Mich.

[73] Assignee: Ford Motor Company, Dearborn, Mich.

[21] Appl. No.: 46,577

[22] Filed: Jun. 7, 1979

[51] Int. Cl.³ .............................................. H04J 6/00
[52] U.S. Cl. ........................................ 370/94; 370/85
[58] Field of Search ............................. 370/94, 60, 85

[56] References Cited

U.S. PATENT DOCUMENTS

| | | | |
|---|---|---|---|
| 3,863,220 | 1/1975 | Osawa | 340/147 LP |
| 3,978,451 | 8/1976 | Ho | 340/147 LP |
| 4,013,959 | 3/1977 | Patterson | 370/94 |
| 4,063,220 | 12/1977 | Metcalfe | 370/94 |
| 4,161,786 | 7/1979 | Hopkins | 370/94 |

Primary Examiner—David L. Stewart
Attorney, Agent, or Firm—Peter Abolins; Clifford L. Sadler

[57] ABSTRACT

An apparatus for enabling communications between two or more transceivers when a plurality of transceivers share a common communication medium or channel. The geographical locations of the transceivers are such that the propagation delay between any source to destination pair is relatively a small function of the transmission duration or packet time. In order to prevent two or more transceivers from simultaneously transmitting over the common medium, each transceiver requires a control apparatus. The simultaneous transmission by two or more transceivers is not very likely due to different start times. However, if such start times differ by less than the propagation delay between the transceivers then interference will result. Hence the control apparatus includes a means of resolving such contention interferences by providing a retransmission delay to govern the transmission.

10 Claims, 8 Drawing Figures

\* CONTENTION PERIOD

. CONTENTION-PROPAGATION TIME INTERVAL

. 'a' - RATIO PROPAGATION TIME/PACKET TIME

. 'a' DEPENDENT ON PACKET LENGTH
          DATA RATE
          CABLE LENGTH

\* COLLISION INTERFERENCE

. CSMA - $\overline{Y} + 1 + a$, $\overline{Y}$ = ARRIVAL LAST PACKET

. CSMA/CD - $\overline{X} + a$, $\overline{X}$ = ARRIVAL FIRST PACKET

CONFLICT RESOLUTION BY RETRANSMISSION DELAY ON SHARED COMMUNICATION MEDIUM

BACKGROUND OF THE INVENTION (1) Field of the Invention

The present invention relates to a multipoint data packet switched communication system and a communication apparatus for controlling access and resolving conflicts on a shared communication medium.

(2) Prior Art

Packet switching networks came into existence in response to the need for efficient and economical data communications. As networks grew, there has been a need for inexpensive, high-capacity communication channels. Satellite communication technology may offer a solution with its broadband channels. The satellite acts as a pure transponder repeating whatever it receives and beaming this transmission back down to earth. The satellite is characterized as a high-capacity channel which has a fixed propagation delay that is relatively large compared to the packet transmission time. The difficulty is in controlling access to the channel where the user devices are geographically distributed.

An alternative method of providing communications among a large number of data communication devices is through a ground radio packet switching system. Ground radio systems have been available for many years. The basic principles involved are similar to the satellite packet switching system. In both systems there is a broadcast channel in which, when two or more packet transmissions overlap in part or completely, the packet transmissions will interfere and destroy each other. This is called interference or collision. The fundamental difference is that in the ground radio system, the propagation delay of the medium is small compared to a packet transmission time.

Consider the case of a collection of transceivers, each of which is attempting to transmit over a shared communication channel. When two separate source transmissions overlap in part or completely they will interfere and destroy each other. When the communication channel is characterized with a propagation delay between any source and destination nodes as being relatively small with respect to that of the transmission duration, then it is more efficient to sense if the channel is idle before attempting transmission. The transceiver should be able to listen to the channel through the use of a carrier detect signal. If the carrier signal is heard then the transmitter will realize that the channel is in use and will defer or postpone its transmission until the channel is sensed to be idle.

This property of carrier deference, does not guarantee channel acquisition. Two or more transceivers may detect the channel idle and attempt transmission. However, the detection of carrier from another transmitter may take the end-to-end propagation delay of the medium. Therefore, interference from multiple simultaneous transmissions may occur. The transceiver transmitting determines that its previous transmission was unsuccessful due to the absence of a positive acknowledgement from the receiving node. It then reschedules its transmission of data. The receiving station itself can determine that the transmission was in error through the use of a cyclical redundancy coding of the block.

Consider the case where the transceiver can listen to its own transmission and determine when interference exists. When interference is detected it could then truncate transmission and reduce the collision period. If the smallest transmitted element (bit) on which interference can be detected is less than the propagation time "Td" over the medium, then the channel is guaranteed to be captured after this time "Td". However, the transceiver can only be assured of medium capture after twice the propagation delay which is the round trip time to sense collision. Once a transmission has been in progress for the end-to-end propagation medium time, all transmitters will be deferred and the transmission will complete without collision.

In view of the foregoing, the problem is how to share and control access to the broadcast communication channel with an acceptable level of performance. Several techniques have been employed or proposed in the past. Among these various schemes are the following:

1. Time Division Multiplexing—Round Robin Schemes
2. Time Division Multiplexing—Alternating Priorities
3. Slotted Access
4. Random Access
5. Carrier Sense Multiple Access
6. Aloha Access
7. Reservation Techniques The small propagation delay ratio for a ground radio system suggests using the packet switched mode of operation known as "Carrier Sense Multiple Access" (CSMA). In a CSMA system, a transceiver or a modem is able to listen to the medium or channel. If a carrier signal is heard, the transceiver realizes that the channel is busy with a transmission from some other transceiver and will postpone its transmission until the channel is sensed to be idle. This method is useless with a satellite system since the sensed channel state provides information about the channel that is ancient history. The rules for deciding when a transceiver may transmit determines the channel capacity. Three types of "persistent CSMA" protocols, known as 1-persistent, nonpersistent and p-persistent CSMA, have been proposed and studied. (See for example, Queuing Systems, Vol. II: Computer Applications, L. Kleinrock, John Wiley and Sons, 1976). The various protocols differ by the action a transceiver takes after sensing the channel. When a transceiver determines that its transmission was unsuccessful due to the lack of a positive acknowledgement or an interference detection signal, it reschedules the transmission. In all cases, the retransmission of the packet is according to a randomly distributed transmission delay. Slotted versions of these CSMA techniques can be considered in which the time axis is slotted with the slot size equal to the one-way propagation delay of the medium. Transmission can only be attempted at the beginning of a slot. Nevertheless, retransmission is by a random distribution function.

The problem is to eliminate this random retry which may result in another packet collision during retransmission. An apparatus is required which can control the access to the channel. These are some of the problems this invention overcomes.

SUMMARY OF THE INVENTION

This invention is an apparatus that resolves contention or interference between two or more transceivers by providing a retransmission delay. The apparatus extracts from the communication medium the necessary information required to determine the time of packet retransmission. To perform this extraction, a transceiver must have the capability of detecting the presence or absence of a carrier signal as well as the ability to detect interference when transmitting. If interference is detected, then transmission must be interrupted. The ability to detect the presence or absence of a carrier is sufficient to obtain information about the relative propagation delay between contending transceivers. The truncation of packet transmission due to interference can be used to determine when another transceiver first accessed the channel. With this information, a retransmission delay can be generated which controls the time of retry. For interferring transceivers not to collide upon retry they must attempt transmission at time differences greater than the propagation delay between them.

Various control means can be implemented that are based on measuring when collision interference, idle and busy channel occur. One control means can use the time period between collision and idle as a time weighting distribution function. Alternatively, there can be comparison of the time interval between starting transmission and collision, with that of the time interval between collision and channel idle. The results of the comparison can be used to determine if the transceiver should wait or retry with a minimum delay.

DESCRIPTION OF THE SPECIFIC EMBODIMENTS

Figure 1:
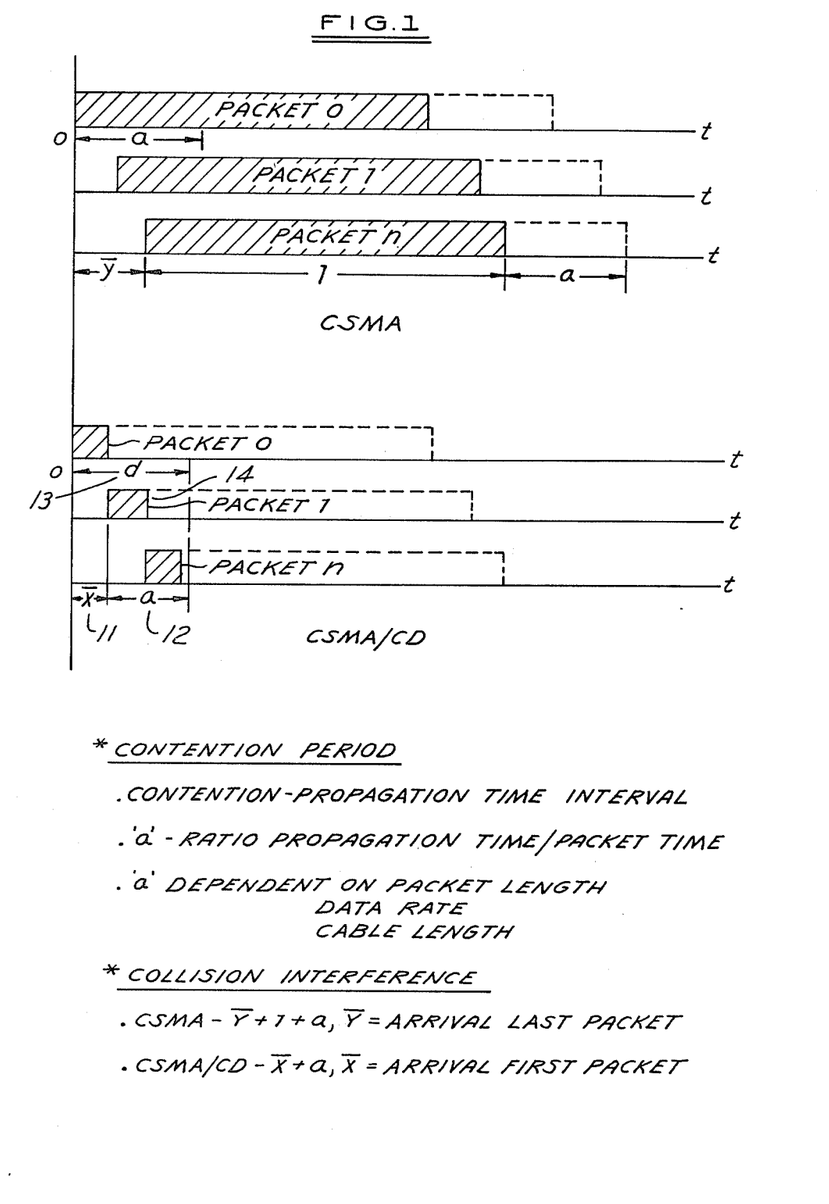
FIG. 1 is an illustration which compares the collision interference period for a "Carrier Sense Multiple Access" scheme to that of a "Carrier Sense Multiple Access with Collision Detection".

In accordance with an embodiment of this invention, a transceiver 20 shown in FIG. 5 must be capable of detecting the presence or absence of carrier (on line 12) as well as the ability to detect interference (on line 13). A transceiver or modem 20 is a unit that converts digital data from a computer or terminal device 30 to a modulated or encoded carrier waveform required by communication medium 31. When medium 31 is found to be silent, transceiver 20 is allowed to transmit. If interference is detected by the sending transceiver, the transmission is interrupted as shown in FIG. 1 under CSMA/CD (Carrier Sense Multiple Access with Collision Detection). In such a system when collision is detected the transmission of the packet is interrupted or truncated. The duration of interference (on line 13) is the duration of arrival time (on line 11) of a first packet 14 and the propagation delay time (on line 12).

Figure 5A:
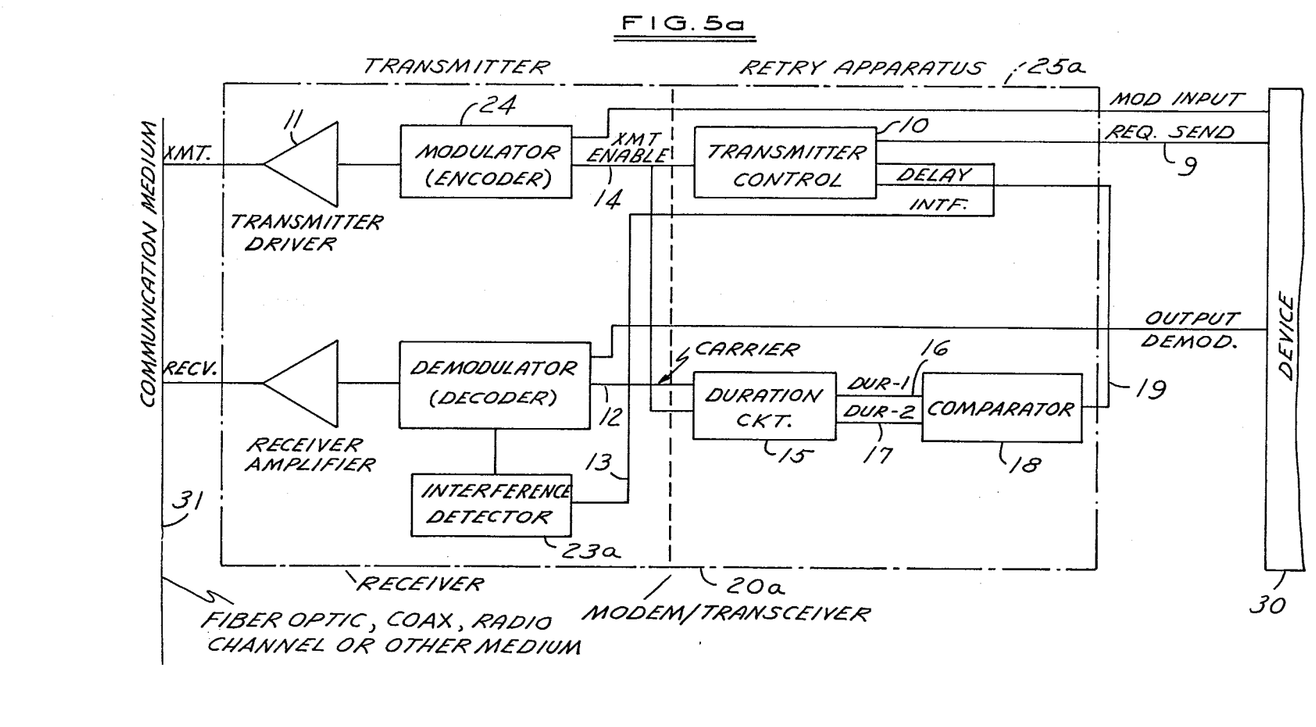
FIGS. 5A and 5B are block diagrams showing a control means for determining a retransmission delay in accordance with an embodiment of this invention.

Referring to FIG. 5A, a retry apparatus 25a resolves contention interference from the simultaneous transmission by two or more transmitters 11. The interference detector signal (on line 13a) is coupled to a transmitter control circuit 10 which disables an encoder 24 through the transmitter enable signal (on line 14a) when interference is detected. The carrier sense signal (on line 12) and transmitter enable signal (on line 14) are coupled to a duration circuit 15 which processes these inputs and produces output signals proportional to the duration between a busy channel and interference (DUR-1) on line 16, and between interference and idle channel (DUR-2,) on line 17. These output signals are coupled to a comparator which computes a retransmission time or output delay signal (on line 19). After comparing the first and second durations, the output delay signal is generated which is either one or two times the propagation time for the medium dependent upon the comparison results. If the first duration (DUR-1) exceeds the second duration (DUR-2), the retransmission delay is the propagation delay of the medium, where the propagation delay time is the time required for transmission between the two furthest spaced transceivers; otherwise, the retransmission delay is twice the propagation delay time. Alternatively, if the second duration exceeds the first duration, the retransmission delay is the propagation delay of the medium; otherwise, the retransmission delay is twice the propagation delay time. The delay signal (on line 19) as well as the request-to-send signal (on line 9) are coupled to a transmitter control means 10 which governs encoder 24.

Figure 5B:
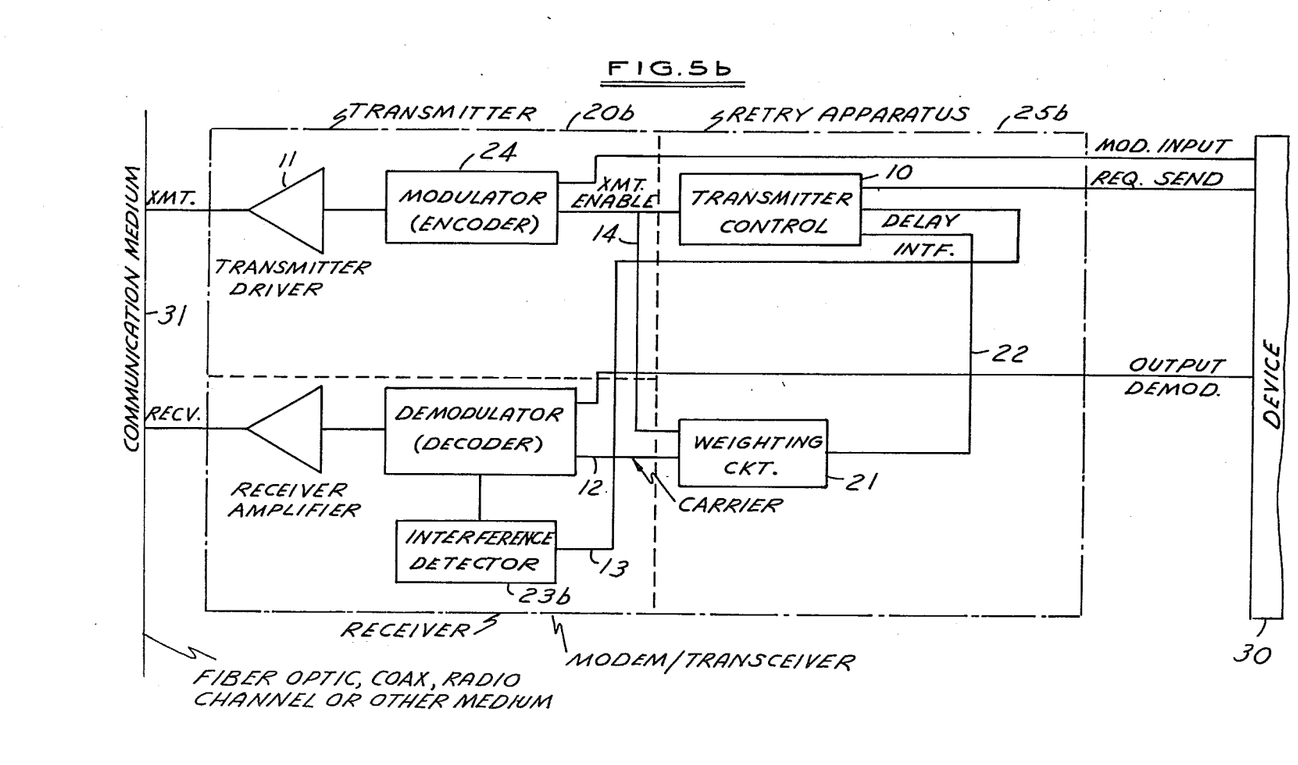

In FIG. 5b, there is shown an alternative retry apparatus 25b. The carrier sense (on line 12) and transmitter enable signal (on line 14) are coupled to a weighting circuit 21 which produces retransmission delay signal (on line 22). The interference detection signal (on line 13) is coupled to transmitter control circuit 10 which disables encoder 24 through the transmitter enable signal (on line 14) when interference is indicated by a detector 23b. This weighting circuit 21 generates an intermediate function "F1" which is dependent upon the period "P" between interference and channel idle. The "F1" function should be choosen such that when it is evaluated its value is smaller for the transmitting unit that attempted transmission first (for example, $F1 = 1 - eP$). By weighting the "F1" function by a second multiplier function F2, the product F1 times F2 can be used to generate the retransmission delay signal (on line 22). Other transceivers which did not previously contend for the medium wait at least twice the propagation time after sensing no carrier on the medium (idle). The delay signal (on line 22) is coupled to transmitter control means 10 to govern the access of the transmitter to medium 31.

Figure 4:
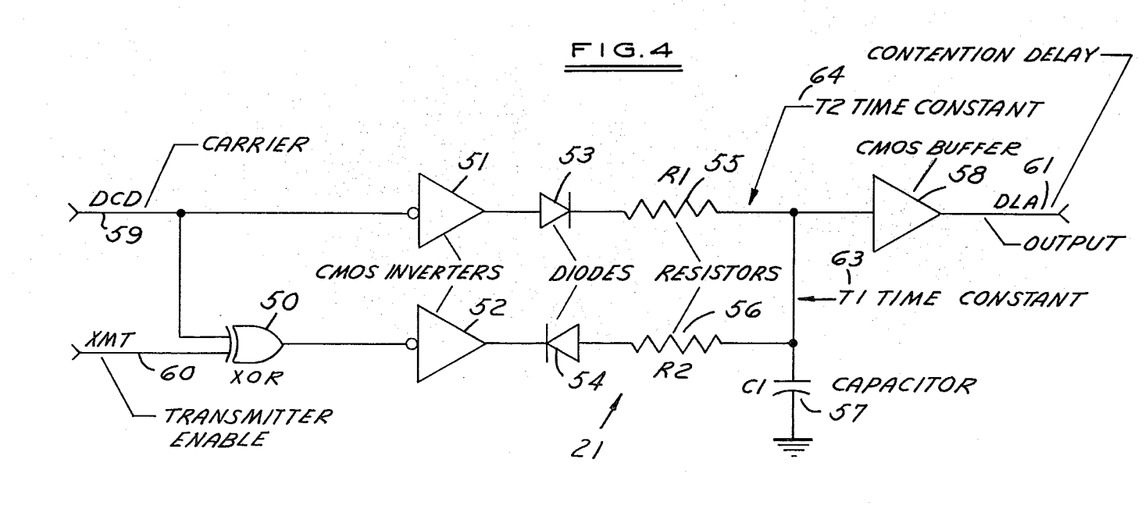
FIG. 4 is a circuit diagram which illustrates one implementation of a weighting means for determining the retransmission delay in accordance with an embodiment of this invention.

The hardware implementation of weighting circuit 21 is shown in FIG. 4. When the transceiver detects interference, it will retry after waiting the retransmission delay time. The delay time is generated by two integrators whose time constants are set by an analog circuit. The first time constant T1 (on line 63) is proportional to the cable to cable propagation delay. This time constant is activated if the cable is busy and the user is not transmitting. However, if the transceiver is attempting to transmit and detects interference, then it activates the time constant when the transmitter is interrupted. The second time constant T2 (on line 64) is a time multiplier.

The T2 time constant (on line 64) is several times larger than T1 (on line 63). The first integrator starts when the transceiver detects channel transmission. When the channel goes idle, the second integrator will begin at a point summed with the first integrator. After timing to the delay threshold of a buffer 58 (without detecting channel busy) the transceiver will be ready for immediate retry of the data channel.

The T1 time constant is implemented by a series connection of a diode 54, a resistor 56 and a capacitor 57 which is connected between ground and resistor 56. Time constant T2 is implemented with a series connection of a diode 53 and a resistor 55 connected in parallel with diode 54 and resistor 56. A CMOS inverter 51 is used to reverse bias diode 53 when there is a carrier applied to the input of inverter 51. It is also used to forward bias diode 53 when there is no carrier. The transmit enable signal 60 is assumed to be high when the transmitter is transmitting, but is interrupted and goes low when interference is detected. The carrier signal 59 and the transmit enable signal 60 are coupled to an exclusive-OR gate 50. Output signal 62 from gate 50 is applied to inverter 52 which forward biases diode 54 when a carrier signal is detected and there is no transmission from the local transceiver. Otherwise, diode 54 is reverse biased. The voltage at capacitor 57 is buffered by a high impedance input buffer 58 which generates the retransmission delay signal 61. The retransmission delay can be used to control access to the communication medium 31. An Appendix hereto includes the mathematical foundation for determining the retransmission delay time. A data communication system suitable for use with this invention is further described in a copending application entitled "Communication Broadcast Channel Interface", (Ser. No. 046,578, 78-71I) filed on even date herewith, assigned to the assignee of this application, the disclosure of which is hereby incorporated by reference.

Various modifications and variations will no doubt occur to those skilled in the various arts to which this invention pertains. For example, the particular user configuration and communication medium may be varied from that disclosed herein. These and all other variations which basically rely on the teachings through which this disclosure has advanced the art are properly considered within the scope of this invention as defined by the a appended claims.

APPENDIX

The following is a mathematical explanation of determining the retransmission delay time for (1) Two transceivers, (2) Three transceivers and (3) N transceivers.

I. This explanation will use the following notation:

| NOTATION | DEFINITION |
|---|---|
| x,y | denotes transceivers |
| (x/y) | represents the occurrence of a transmission event by transceiver y with respect to transceiver x in transceiver x's time domain |
| Lx | location of transceiver x in space |
| d | propagation time per L unit of length |
| Td | maximum propagation delay of channel |
| $Tp(x/y) = (Lx - Ly)d$ | |
| $Txy = (Lx - Ly)d$ | |
| $Ts(y/y)$ | starting time of transmission of transceiver y with respect to its own time domain |

Figure 2A:
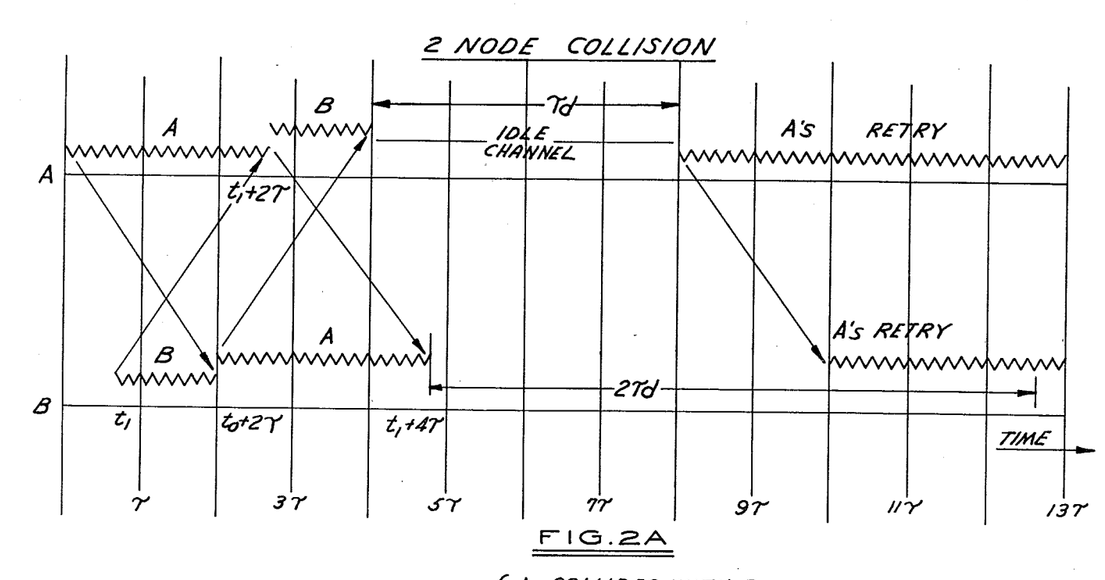
FIGS. 2A and 2B are a timing diagram which shows how conflict is resolved between two interferring nodes "A" and "B" and a diagram representing the propagation delay between nodes A and B, respectively.
Figure 2B:
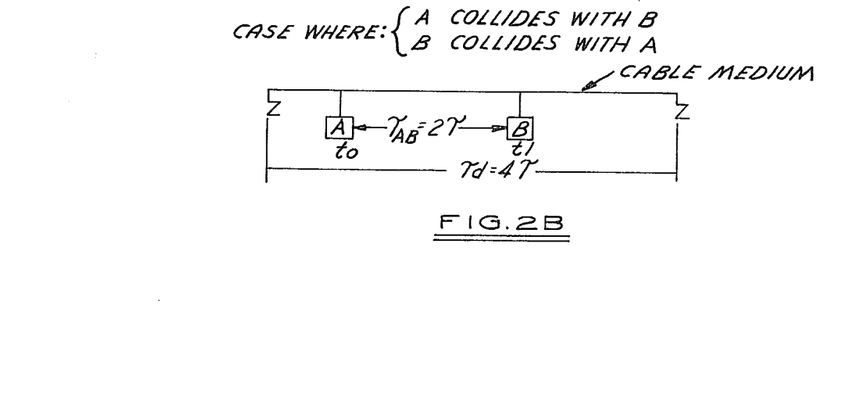

$Ts(x/y) = Ts(y/y) + Tp(x/y)$ which is the initial starting time of transmission of transceiver y with respect to transceiver x's time domain II. This explanation will use the following assumptions:
1. Collision will occur if $Abs(Ts(x/x) - Ts(y/y))$ less than $Tp(x/y)$
2. $Tc(x/z) = \min Ts(x/v)$ where z is the minimum Ts of node x of the set v of all users except x itself and the min $Ts(x/z)$ greater than $Ts(x/x)$
3. Time of idle channel $Ti(x/y) = Tc(y/z) + Tp(x/y)$
4. Time period to collision interference on channel $Ta(x) = Tc(x/z) - Ts(x/x)$
5. $Tb(x) = \max Ti(x/v) - Tc(x/z)$ which is the time period from collision to "real" idle channel, where v is set of all users except x itself III. Retransmission delay computation:

Compare the time interval between starting transmission and when collision occurs on channel with that of the time interval between collision and "real" channel idle. If: Tb less than Ta then retry after waiting a minimum of Td for the last busy signal on channel Otherwise: Wait a minimum of 2 Td for idle channel IV. Consider the two node case in FIG. 2B:

Prove: there exists some x such that $Tb(x)$ less than $Ta(x)$

Note: When A starts transmitting at time To, B perceives the start of A at time $To + Tab$ Following is a four element array representing the starting times of all transmissions.

| Ts(a/a) = To = 0 | Ts(b/a) = Tab |
|---|---|
| Ts(a/b) = Tl + Tab | Ts(b/b) = Tl |

For a collision to occur, transceiver B must start transmission before perceiving channel busy from transceiver A. For a collision to occur, the following must be true: $Abs(T1-To)$ less than $Tp(a/b)$ If collision occurs, then it will occur at a time defined by: $Tc(a/b) = T1 + Tp(a/b)$  $Tc(b/a) = Tp(a/b)$ Time of idle is computed as follows:

Transceiver "B" will sense idle when transceiver "A" detects interference and the lack of transmission propagates to transceiver "B". Transceiver A operates in a similar manner. Time of idle will occur at the following times:

| Ti(a/b) = 2Tp(a/b) | Ti(b/a) = Tl + 2Tp(a/b) |
|---|---|

Next determine both Ta and Tb:

| Ta(a/b) = Tl + Tp(a/b) | Ta(b/a) = Tp(a/b) − Tl |
|---|---|
| Tb(a/b) = Tp(a/b) − Tl | Tb(b/a) = Tl + Tp(a/b) |

Restatement of the delay computation: 1st come 1st serve basis If: Tb less than Ta then retry transmission after waiting Td for idle channel. Otherwise: wait maximum of 2Td for all "v" after idle. In a two transceiver situation the following is true: "A" defers when T1 greater than 0 since Ta−Tb=2T1 for "A" greater than 0, "B" defers when T1 less than 0 since Ta−Tb=2T1 for "B" greater than 0.

Figures 3A, 3B:
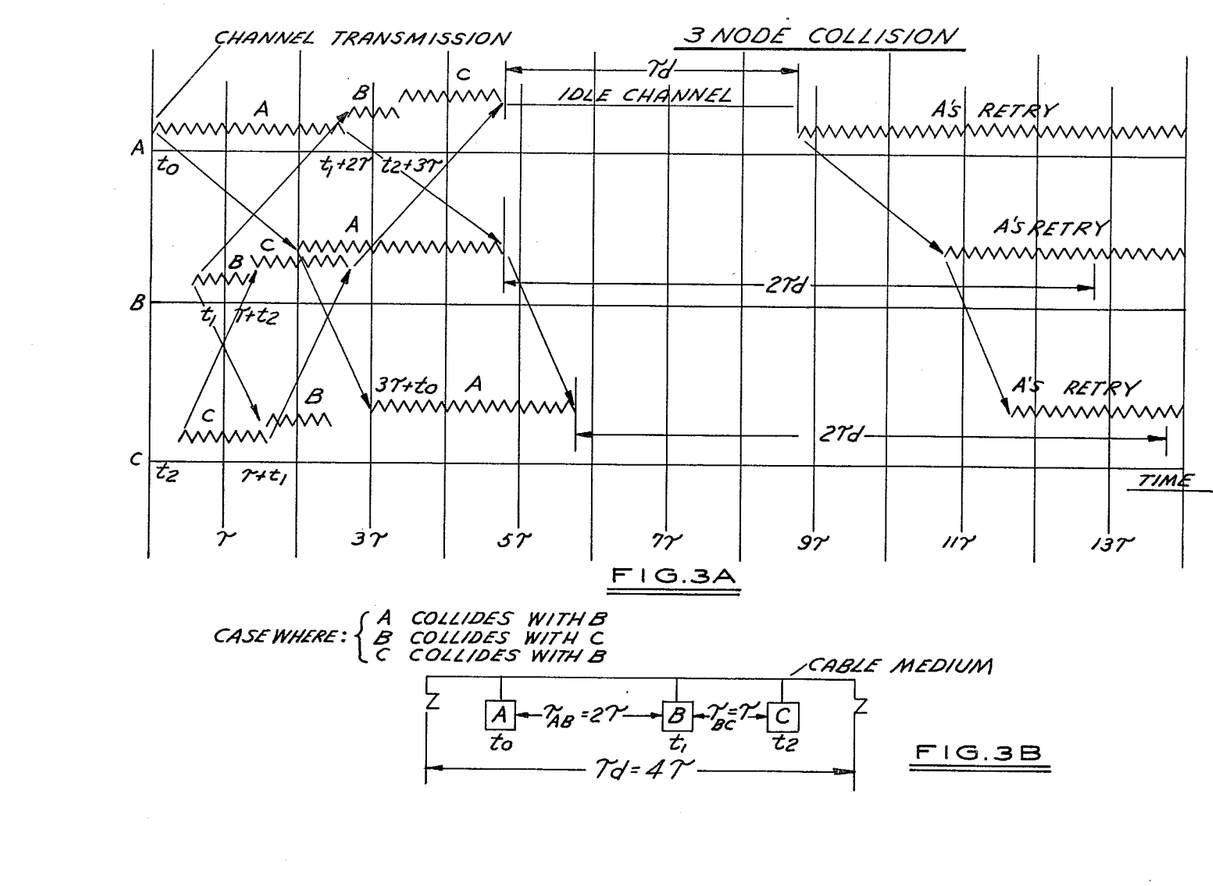
FIGS. 3A and 3B are a timing diagram which illustrates the realization of interference at three separate nodes "A", "B" and "C" due to their simultaneous transmissions and a diagram representing the propagation delays between nodes A, B and C respectively.

V. Consider the three node case in FIG. 3B:

The following is a nine element array representing the starting times of all transmissions:

| | | |
|---|---|---|
| Ts(a/a) = 0 | Ts(b/a) = Tab | Ts(c/a) = Tab + Tbc |
| Ts(a/b) = T1 + Tab | Ts(b/b) = T1 | Ts(c/b) = Tbc + T1 |
| Ts(a/c) = T2 + Tab + Tbc | Ts(b/c) = T2 + Tbc | Ts(c/c) = T2 |

Assume "A" collides with "B"
Note: the case where "C" collides with "B" is handled by just renaming nodes "A" and "C" respectively with their opposite names.
for "B" collide with "A" To less than T1+Tab
for "A" collide with "B" T1 less than To+Tab therefore: —Tab less than T1—To less than Tab

| | | |
|---|---|---|
| Tc(a/b) = T1 + Tab | Tc(b/a) = Tab | Tc(c/b) = T1 + Tbc |
| then | | |
| Tl(a/b) = 2Tab | Ti(b/a) = T1 + 2Tab | |
| Ti(c/a) = T1 + 2Tab + Tbc | | |
| Ti(a/c) = T1 + 2Tbc + Tab | Ti(b/c) = T1 + 2Tbc | Ti(c/b) = Tab + Tbc |

Notice at "C"
No idle between the end of "B's" packet and the start of "A's" packet
$$Ts(c/a) = Tab + Tbc = Ti(c/b) = Tab + Tbc$$
because we assumed "A" collided with "B"
However at node "A"

| | |
|---|---|
| Ts(a/c) = T2 + Tab + Tbc | Ti(a/b) = 2Tab | false idle if T2+Tab+Tbc greater than 2Tab; T2+Tbc greater than Tab; but T2+Tbc greater than Tab for "A" collide with "B"
Therefore: Any node must wait at least Td to determine "real" idle verses false idle. Notice that the maximum time for idle at node "C" is Ti(c/a) since T1 greater than —Tab for "B" collide with "A"
Next determine both Ta and Tb:

| | | |
|---|---|---|
| Ta(a/b) = T1 + Tab | Ta(b/a) = Tab — T1 | Ta(c/b) = T1 + Tbc — T2 |
| Tb = Tab — T1 | Tb = Tab + T1 | Tb = 2Tab |
| When Tab greater than T1 + 2Tbc | | When Tab greater than Tbc |
| Otherwise | | Otherwise |
| Tb = 2Tbc | | Tb = T1 + 2Tbc — Tab |

Define: Tr(x) to be the retry delay time for transceiver.
When Tr(x) is 0 then retry after waiting Td for idle channel otherwise,
Tr(x) is W then Wait until at least 2Td and channel idle For the three node case Tr(x) is defined as:
Tr(a)=0 for T1 greater than 2Tbc—Tab
W otherwise
Tr(b)=0 for T1 less than 0 when Tab greater than Tbc
T1 less than Tab-Tbc when Tbc greater than Tab
W otherwise Tr(c)=0 for T1-T2 greater than 2Tab-Tbc W otherwise
Consider the case where "C" retries
(1) Notice if "C" does not retry then the solution is the 2 node case in IV
(2) In the case where "A" retries with "C" show that "B" will not retry
(3) for "C" to retry T2 less than T1-2Tab+Tbc
(4) for "A" to retry T1 greater than 2Tbc—Tab
(5) Therefore: T2 less than 2Tbc—Tab—2Tab+Tbc=3Tbc—3Tab
In the case where "B" collides with "A" first, then the following inequalities must be true:
Tab less than T2+Tbc T2 greater than Tab—Tbc
Tab—Tbc less than T2 less than 3Tbc—3Tab
4Tab less than 4Tbc
Tab less than Tbc
However: for "A" and "B" to retry with "C" means 2Tbc-Tab less than T1 less than Tab-Tbc
Therefore: 3Tbc less than 2Tab which is false since Tbc greater than Tab
Hence, "B" will not retry and we have a 2 node case.
VI. The previous solution can be extended for resolving the "N" node contention case.
Assume there exist a "K" which will collide with "K-N" transceivers to the left of "K" and "M-K" transceivers to the right, then for all "M-N" transceivers there is an initial time domain array
Define an array (M-N) by (M-N) whose elements are given by Ts(x/y)=Ty+Txy
A portion of the array is:

| Ts(n/n) ... | Ts(k − 1/n)  Ts(k/n)  Ts(k + 1/n) ... | Ts(m/n) |
|---|---|---|
| ....... | ................ | .. |
| ....... | Ts(k − 1/k − 1)Ts(k/k − 1)Ts (k + 1/k − 1) | ... |
| ....... | Ts(k − 1/k)  Ts(k/k)  Ts(k + 1/k) | ... |
| ....... | Ts(k − 1/k + 1)Ts(k/k + 1)Ts(k + 1/k + 1) | ... |
| ....... | ................ | ... |
| Ts(n/m) ... | Ts(k − 1m)Ts(k/m)Ts(k + 1/m) ... | Ts(m/m) |

For the array defined above solve for all x, Tc Tc(x/z)=min Ts(x/v) where z is the minimum Ts of x element of the v of all users except x itself. A minimum (Tc) exists if Tc(x/z) greater than Ts(x/x). If no minimum exists, then remove element (j) and all associated row elements with that x column from that array since collision will not occur, since port (j) will not start message due to carrier deference Determine $Ti(x/y) = Tc(y/z) + Tp(x/y)$ Next solve for: $Tr(x) = 0$ if Tb less than Ta w. otherwise Repeat procedure of constructing initial time domain array until there are no collisions which is the case where $Abs(Ts(x/x) - Ts(y/y))$ less than $Tp(x/y)$.

We claim:

1. A data communication modem adapted for use in conjunction with a plurality of other modems over a shared communication medium, said modem comprising:
- a transmitting and receiving means for transmitting and receiving data over the communication medium;
- a first sense means coupled to said modem for detecting carrier transmission from any of the modems on the communication medium (busy) and for detecting no transmission (idle) on the communication medium;
- a second sense means for detecting simultaneous transmission (interference) of more than one modem;
- a computation means for determining a first duration of time between the time of transition from an idle channel to a busy channel and the time of transmission interference, and a second duration of time between the time of transmission interference and the time of transition from a busy channel to an idle channel; and
- a control means responsive to outputs from said first sense means, said second sense means and said computation means for governing transmission of said modem so that said modem will not transmit until said first sense means is not detecting carrier transmission and will interrupt transmission if interference is detected by said second sense means.

2. A data communication modem as recited in claim 1 including a delay means coupled to said control means for determining a retransmission delay.

3. A data communication modem as recited in claim 2 wherein said delay means includes a weighting means for determining the retransmission delay by using said first and second durations.

4. A data communication modem as recited in claim 3 wherein said weighting means further is adapted for comparing said first and second durations, if said first duration exceeds said second duration then the retransmission delay is the propagation delay of the medium where said propagation delay time is the time required for transmission between the two furthest spaced modems; otherwise, the retransmission delay is twice the said propagation delay time.

5. A data communication modem as recited in claim 3 wherein said weighting means further is adapted for comparing said first and second durations, if said second duration exceeds said first duration then the retransmission delay time is the time required for transmission between the two furthest spaced modems; otherwise; the transmission delay is twice said propagation delay time.

6. A data communication modem adapted for use in conjunction with a plurality of other modems over a shared communication medium, said modem comprising:
- a transmitting and receiving means over the communication medium;
- a first sense means coupled to said modem for detecting carrier transmission from any of the modems on the communication medium (busy) and for detecting no transmission (idle) on the communication medium;
- a second sense means for detecting simultaneous transmission (interference) of more than one modem;
- a computation means for determining a duration of time between transmission interference and the time of transition from a busy channel to an idle channel;
- a control means responsive to outputs from said first sense means, said second sense means and said computation means for governing transmission of said modem; and
- a delay means coupled to said control means for determining a retransmission delay, said delay means including a weighting means for determining the retransmission delay by using said duration.

7. A data communication modem as recited in claim 6 wherein:
said weighting means is further adapted to generate a retransmission delay which is dependent upon the said duration of time such that the delay is monotonically increasing with said duration.

8. A data communication modem as recited in claim 7 wherein said weighting means includes:
- a first parallel combination including the series connection of a first diode and a first resistor, and a second parallel combination including the connection of a second diode and a second resistor, each of said parallel combinations having an input and an output;
- a capacitor having one side connected to ground and the other side connected to the two outputs of said first and second parallel paths;
- said input of said first parallel path being adapted to reverse bias said first diode when there is a carrier applied to said first input and being adapted to forward bias said first diode when there is no carrier supplied to said first input thus causing conduction of said first diode; and
- said second input of said second parallel path being adapted to forward bias said second diode thereby causing conduction of said second diode when a carrier is detected and there is no transmission from local modem at said first input, and reverse biasing said second diode when a carrier is detected and there is local modem transmission at said first and second input and where there is no carrier detected and there is no transmission at said second input.

9. A data communication modem adapted for use in conjunction with a plurality of other modems over a shared communication medium, said modem comprising:
- a transmitting and receiving means over the communication medium;
- a first sense means coupled to said modem for detecting carrier transmission from any of the modems on the communication medium (busy) and for detecting no transmission (idle) on the communication medium;
- a second sense means for detecting simultaneous transmission (interference) of more than one modem;
- a computation means for determining a duration of time between initiating transmission and the time of interference;

a control means responsive to outputs from said first sense means, said second sense means and said computation means for governing transmission of said modem; and a delay means coupled to said control means for determining a retransmission delay, said delay means including a weighting means for determining the retransmission delay by using said duration.

10. A data communication modem as recited in claim 9 wherein:

said weighting means is further adapted to generate a retransmission delay which is dependent upon the said duration of time such that the delay is monotonically decreasing with said duration.

* * * * *